US007894511B2

(12) United States Patent
Zurek et al.

(10) Patent No.: US 7,894,511 B2
(45) Date of Patent: Feb. 22, 2011

(54) MULTI-DEVICE COORDINATED AUDIO PLAYBACK

(75) Inventors: Robert A. Zurek, Antioch, IL (US); Andrew J. Aftelak, Palatine, IL (US); George N. Maracas, Phoenix, AZ (US)

(73) Assignee: Motorola Mobility, Inc., Libertyville, IL (US)

(*) Notice: Subject to any disclaimer, the term of this patent is extended or adjusted under 35 U.S.C. 154(b) by 807 days.

(21) Appl. No.: 11/459,064

(22) Filed: Jul. 21, 2006

(65) Prior Publication Data

US 2008/0037674 A1 Feb. 14, 2008

(51) Int. Cl.
*H04L 5/16* (2006.01)
(52) U.S. Cl. .................................... 375/220; 375/222
(58) Field of Classification Search .............. 375/219, 375/220, 222, 259, 257, 295, 316
See application file for complete search history.

(56) References Cited

U.S. PATENT DOCUMENTS

| 2003/0004724 | A1* | 1/2003 | Kahn et al. ............... 704/260 |
| 2003/0198254 | A1 | 10/2003 | Sullivan et al. |
| 2003/0198255 | A1 | 10/2003 | Sullivan et al. |
| 2004/0205204 | A1 | 10/2004 | Chafe |
| 2005/0131558 | A1 | 6/2005 | Braithwaite et al. |
| 2005/0254662 | A1 | 11/2005 | Blank et al. |
| 2006/0002681 | A1 | 1/2006 | Spilo et al. |
| 2006/0013407 | A1 | 1/2006 | Peavey et al. |
| 2008/0155616 | A1* | 6/2008 | Logan et al. ............... 725/93 |

FOREIGN PATENT DOCUMENTS

| EP | 1542503 A1 | 6/2005 |
| JP | 2004-056579 A1 | 2/2004 |

OTHER PUBLICATIONS

PCT Notification of Transmittal of the International Search Report and the Written Opinion of the International Searching Authority, or the Declaration, mailed Feb. 6, 2008, pp. 1-12, PCT No. PCT/US2007/070195, European Patent Office.
Japanese Patent Office, Translation of Search Report, dated Mar. 23, 2010, pp. 1-2, Japanese Pat. Appl. No. 2007-167046.

* cited by examiner

*Primary Examiner*—Emmanuel Bayard

(57) ABSTRACT

A wireless device (100) provides coordinated audio playback. The device (100) includes a network interface (112) that receives a signal from a sending or originating device (401) and sends a reply to the signal. A network delay value is then calculated based on the reply to the signal. The wireless device (100) then receives a location of the originating device (401) and at least a portion of an audio file. The wireless device (100) generates audio from the audio file, with the generation being coordinated with audio generation by the originating device (401) based upon the network delay value and the distance between the wireless device (100) and the originating device (401).

18 Claims, 5 Drawing Sheets

MULTI-DEVICE COORDINATED AUDIO PLAYBACK

FIELD OF THE INVENTION

The present invention relates generally to cellular telephones, and more particularly relates to cellular telephones that can be combined in a group to form a unified audible audio playback system.

BACKGROUND OF THE INVENTION

Wireless devices, such as cellular telephones, PDAs, laptop computers, palmtop computers, handhelds, and others, are frequently equipped with externally audible audio playback capability, meaning audio can be heard by the naked ear at some distance away from the device. This playback is typically accomplished through use of at least one speaker. In the case of telephones, this feature is commonly referred to as "speakerphone" functionality.

Unfortunately, due to the relatively small size of cellular telephones, and their necessarily small speakers, these devices are not able to produce audio at a volume level that can be heard simultaneously by an appreciable number of people. Presently, if a user wishes to share audio with multiple users, that user is presented with two choices. The first choice is to have the other users crowd around the device. This can be uncomfortable both physically and socially.

A second choice available to a sharing user is to send an audio file to a multitude of other user's individual devices for playback on the individual devices. However, this choice suffers from several disadvantages. For instance, if an environment is desired where all users listen to the audio together, such as the playback of a song or other audio, it is currently not possible to coordinate the devices so that each user hears the audio in a single phase. If all users were able to start the audio playback at exactly the same time (which may not even be possible), each user would hear his device first and then sequentially hear the same time point in each other device's audio playback, in order of increasing distance from the user to the playback device, so as to create a muddied sound or an echo effect. Even if, alternatively, each device was able to delay or speed up its start time to compensate for distance from a central point, there is no way to account for devices that have interruptions in playback due to processor interruptions (e.g., multitasking), network or device streaming delays, slight differences in the actual start of actual audio playback due to processor variations among devices, and others.

Therefore a need exists to overcome the problems with the prior art as discussed above.

SUMMARY OF THE INVENTION

Briefly, in accordance with the present invention, disclosed is a wireless audio playback device that includes a location determining circuit that determines a position of the wireless audio playback device. The device also includes an interface that receiving a signal from an originating device and sends a reply to the signal. The device then receives a network delay value based at least in part on the reply to the signal. A location of the device is then determined and at least a portion of an audio file is received by the device. Audio is generating from the audio file and played by an audio output after being coordinated with audio generation by the originating device. The coordination is based upon the network delay value and a distance between the wireless audio playback device and the originating device.

In embodiments of the present invention, the audio file is either sent from the originating device, streamed/downloaded from a network, or previously stored on the playback device.

In one embodiment, the network delay is a time for the signal to travel over a network path from the originating device to the wireless playback device.

In yet another embodiment, the location of the originating device is a distance between the wireless playback device and the originating device.

In still other embodiments, the device includes an audio input for receiving an audio signal generated by a first wireless device and a comparator for comparing a timing of the received audio signal with a timing of the audio generated by the first wireless device.

Other embodiments of the present invention provide a method and a computer readable medium for coordinating audio playback between two or more devices.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
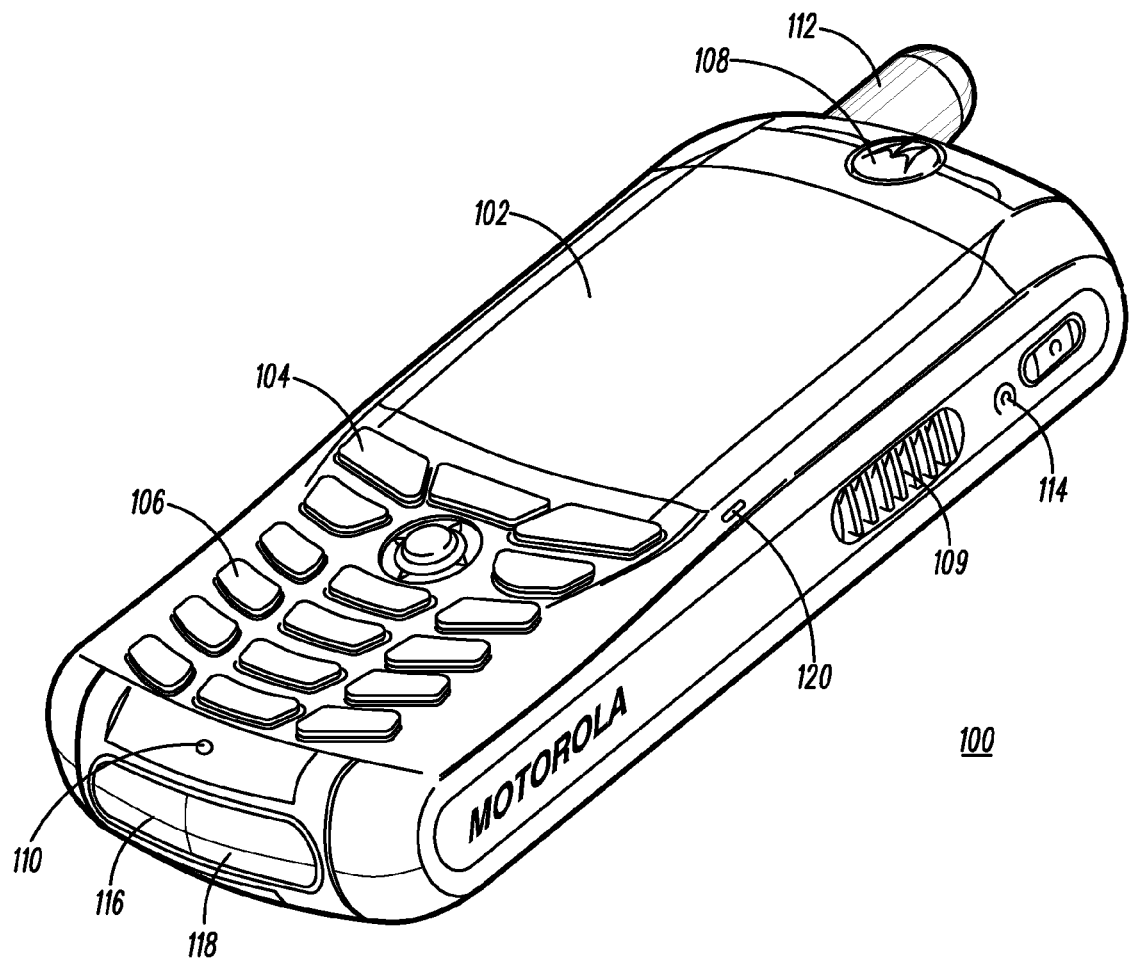
FIG. 1 is an isometric diagram illustrating one embodiment of a wireless device in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The present invention, according to an embodiment, overcomes problems with the prior art by providing a wireless device that is able to dynamically adjust its phase of audible audio media playback in order to coordinate and remain in coordination with one or more other nearby playback devices, so as to create a shared wireless media experience, while maintaining a high level of music quality.

Described now is an exemplary hardware platform for use with embodiments of the present invention.

Wireless Device

Referring now to FIG. 1, an exemplary wireless device 100 is shown. The specific wireless device 100 depicted in FIG. 1 is a cellular telephone. As will be clear however, the present invention is not so limited and can also be used with other wireless devices and non-wireless devices that are triggered by an electrical event, such as wirelessly receiving a signal.

Wireless devices include, but are not limited to, PDA's, SmartPhones, Laptops, Pagers, Two-way Radios, satellite phones, and other communication devices. In one embodiment of the present invention, the wireless device 100 is capable of receiving and transmitting radio frequency signals over a communication channel under a communications protocol such as CDMA, FDMA, TDMA, GPRS, and GSM or the like. For the purposes of illustration and ease of discussion, a wireless telephone, its structures, and functions will be referred to throughout the remainder of the specification.

The cellular telephone 100 includes a display 102 for viewing information and commands, command buttons 104 for controlling modes and commands of the device, buttons 106 for entering information and dialing numbers, an earpiece speaker 108 for generating voice and messaging information, audible alerts, and any other audio in a private manner, one or more high audio speakers 109 for generating voice and messaging information, audible alerts, and any other audio at arms length, a microphone 110 for capturing and converting audible sounds to proportionate voltages, a light source 120 for visual indications, an antenna 112 for wirelessly communicating with a remote sender or receiver, a jack 114 for connecting external audio playback devices, such as a headphone or speaker, a battery charger jack 116, and input/output (IO) ports 118 for accessing the phone's internal circuitry for purposes such as inputting and outputting data.

The wireless device 100 interfaces with provider equipment via a wireless communication link established with base stations. The wireless device 100, according to the present example, works in conjunction with the provider equipment to provide a user with services such as telephone interconnect, short message service, dispatch or instant conferencing, circuit data, packet data, and combinations thereof, as well as other data services.

System and Network Overview

Figure 2:
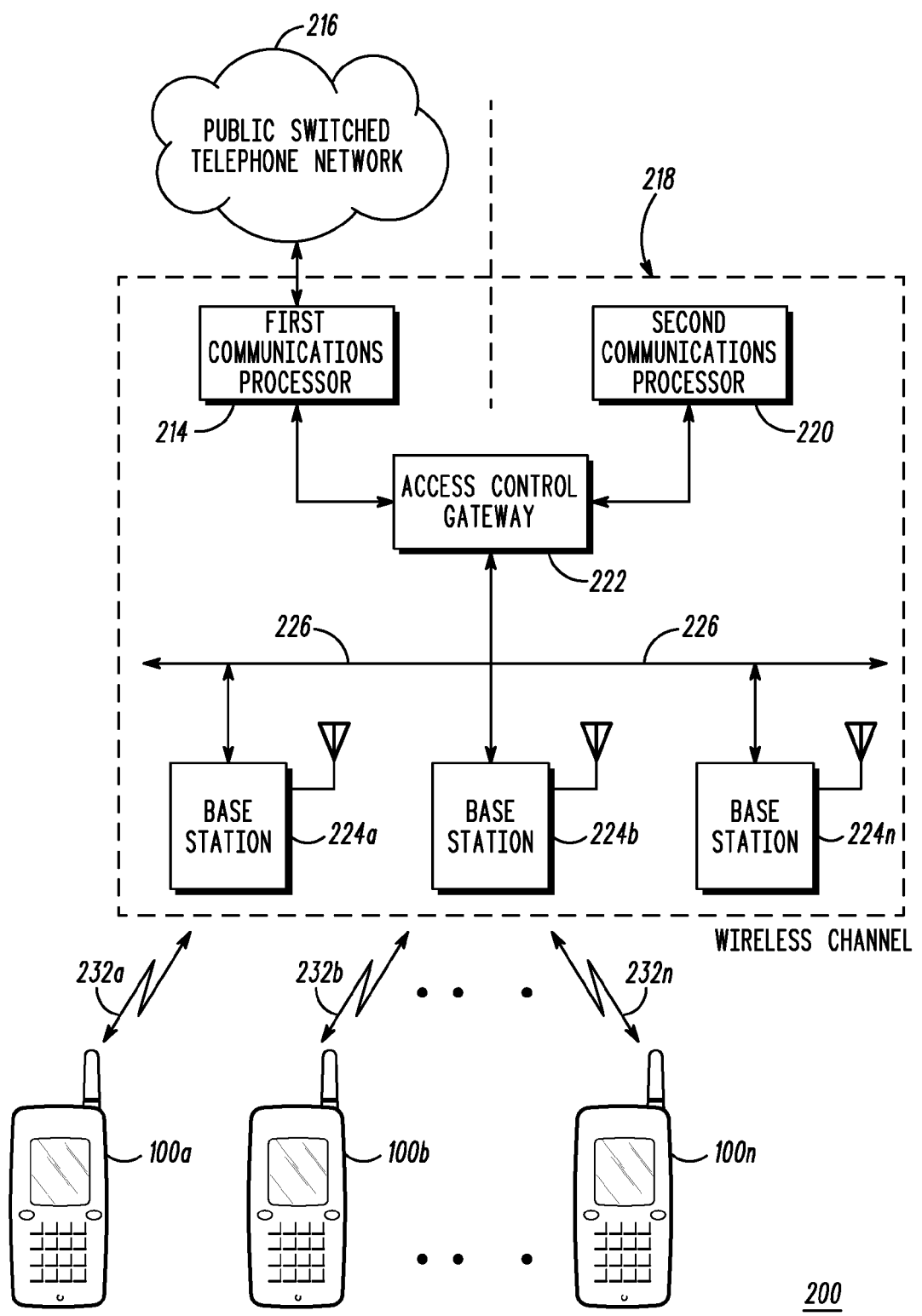
FIG. 2 is a block diagram of a radio communication system in accordance with an embodiment of the present invention.

FIG. 2 shows a block diagram of a radio communication system 200 in accordance with one embodiment of the present invention. The radio communication system 200 includes provider equipment 218, which is coupled to a public switched telephone network 216 and subscriber units 100a-n. The provider equipment 218 includes an access control gateway 222, a first and a second communications processor 214 and 220, a communication channel 226, and base stations 224a-n. In one embodiment, the access control gateway 222 performs communication management and access control for the subscriber units 100a-n, in a manner well known in the art. The first communications processor 214 interfaces with the public switched telephone network 216 and the access control gateway 222 to provide a gateway for managing and routing messages to and from particular subscriber units 100a-n that request a telephone two-way wireless communication mode or receive communications in a telephone two-way wireless communication mode. These messages may be obtained from a source outside the radio communication system via the public switched telephone network 216, or may be sourced from an internally serviced subscriber unit 100a-n or other equipment. The second communications processor 220 is used to provide direct communication between the originating subscriber and the target subscriber without accessing the public switched telephone network 216. The base stations 224a-n are coupled to the access control gateway 222 and are ordinarily geographically dispersed to service subscriber units in specific geographic regions. The subscriber units 100a-n are radio communication devices that interface with the access control gateway 222 via wireless communication links 232a-n established with the base stations 224a-n. The subscriber units 100a-n may be portable or mobile radio telephones that work in conjunction with the provider equipment 218 to provide a user with services such as telephone interconnect, short message service, dispatch or instant conferencing, circuit data, packet data, and combinations thereof, as well as other data services.

It should be noted that the present invention is not limited to conventional cellular network communication and is operable as well in an ad-hoc network model, for instance, where there is handset to handset communication over a local area. Examples of this type of network are a local area network (LAN), a wireless local area network (WLAN), a personal area network (PAN), and others that allow communication between devices in close proximity to each other (e.g., 1-200 meters). The communication protocol can be Bluetooth, Ultra-wideband, WiMAX, WiFi, 802.11, and others.

Wireless Device Internal Circuits

Figure 3:
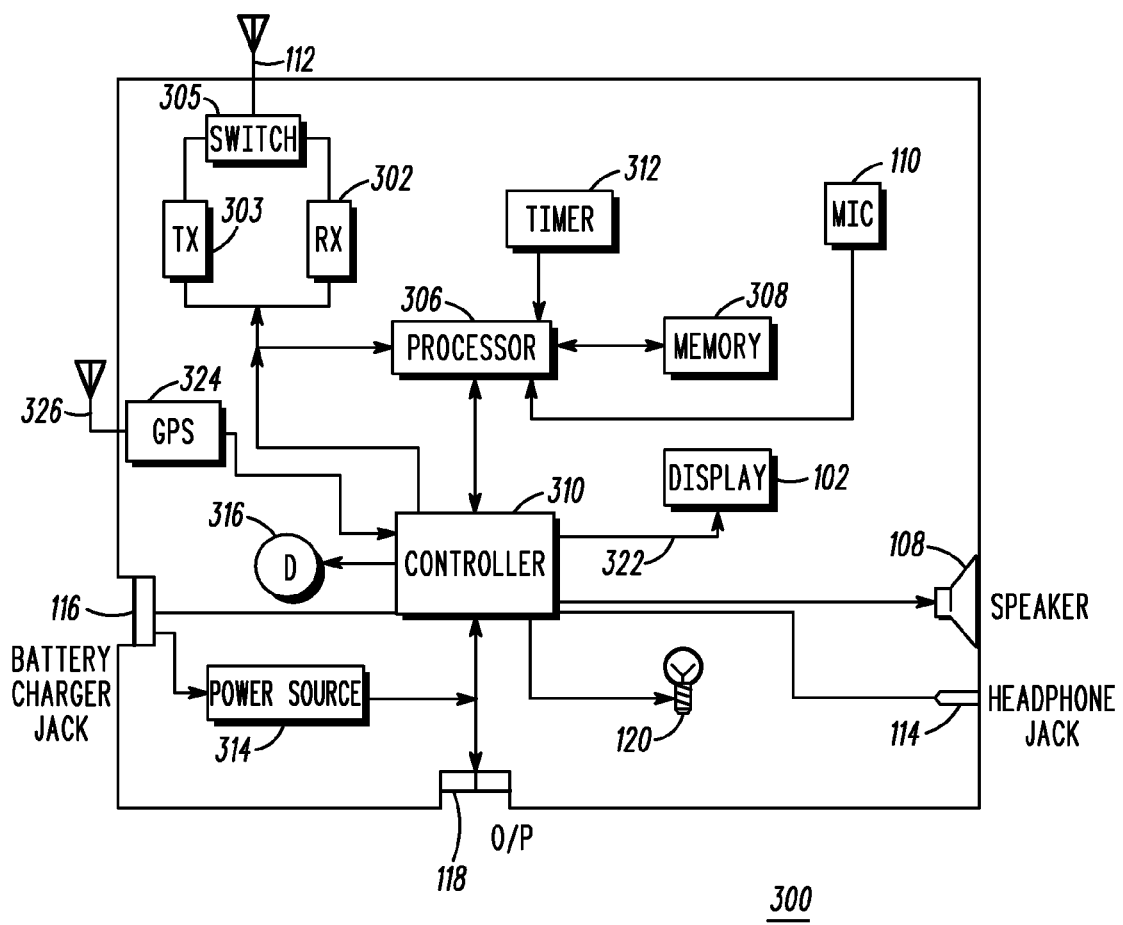
FIG. 3 is a hardware block diagram illustrating one embodiment of a wireless device in accordance with the present invention.

Referring now to FIG. 3, a block diagram of an exemplary electronic circuit 300 internal to the wireless device 100 is shown. The circuit 300 includes a transmitter 303 and a receiver 302. The transmitter 303 and receiver 302 are coupled via an antenna switch 305 to an antenna 112. For transmit operations, the antenna switch 305 couples the transmitter 303 to the antenna 112. Similarly, for receive operations, the antenna switch 305 couples the antenna 112 to the receiver 302. The transmitter 303 and receiver 302 are coupled to a processor 306.

The processor 306 is able to execute program instructions stored in a memory 308 and to store data received from receiver 302 and antenna 112 in memory 308. The processor 306 is also coupled to a controller 310, which selects between incoming-call notification modes in response to instructions provided from the processor 306. The processor 306 and controller 310 can be separate, discrete components or can be a single integrated unit. A timer module 312 provides timing information to the processor 306. The processor 306 utilizes the time information from the timer module 312 to keep track of scheduling or executing tasks. The wireless device 100 also includes a power source 314, such as a DC battery.

The controller 310 also couples the processor 306 to a global positioning system (GPS) receiver 324. The GPS receiver 324 receives signals from satellites via GPS antenna 326 in a well-known manner to enable the device 100 to determine its geographic location on the earth. Many GPS units are accurate to within four feet or less.

The circuit 300 outputs to a group of notification elements, also shown in FIG. 1, as part of the overall user interface of device 100. As can be seen in FIG. 3, in this example, each notification element is controlled by the controller 310. The controller 310 controls and outputs signals to the notification elements when instructed to do so by the processor 306 by sending signals along electrically conducive signal lines that couple the controller 310 and the individual notification elements, all shown in FIG. 3. The signal can consist of analog or digital signals, such as those used to drive the earpiece speaker 108 or high audio speakers 109 to produce sound. The controller 310 outputs include audible alerts and audio signals, such as music or voice, that are produced by sending signals to the earpiece speaker 108 or high audio speakers 109. The controller 310 also outputs visual alerts by either sending information to the display 102 or a signal to light source 120 and outputs signals on data output 118 or antenna 112. The controller 310 also is connected to an external audio output jack 114. In one embodiment of the present invention, when a headphone or other speaker is attached to the audio output jack 114, the controller does not send audio to the earpiece speaker 108 or high audio speakers 109. The circuit 300 also includes a vibrator or haptic module 316. The controller 310 can produce a physical tactile stimulation to the user via signals sent to the haptic module 316.

The electrical circuit 300 of FIG. 3 is housed inside of the wireless device 100 shown in FIG. 1. The exterior of the wireless device 100 has several electrical contacts 114 and 118 that are electrically coupled to outputs of the electrical circuit 300 and are accessible external to the electrical circuit 300. The outputs of electrical circuit 300 are indicated by arrows pointing away from the controller 310. In one embodiment, output 118 can be connected to an external speaker for audio playback.

Other outputs and signal interfaces not specifically shown in the figures, but that are well known to those of ordinary skill in the art, will work equally as well as those that are shown in FIGS. 1 and 3 and can be used in further embodiments of the present invention to achieve the same or similar results.

Overview of Group Playback

Figure 4:
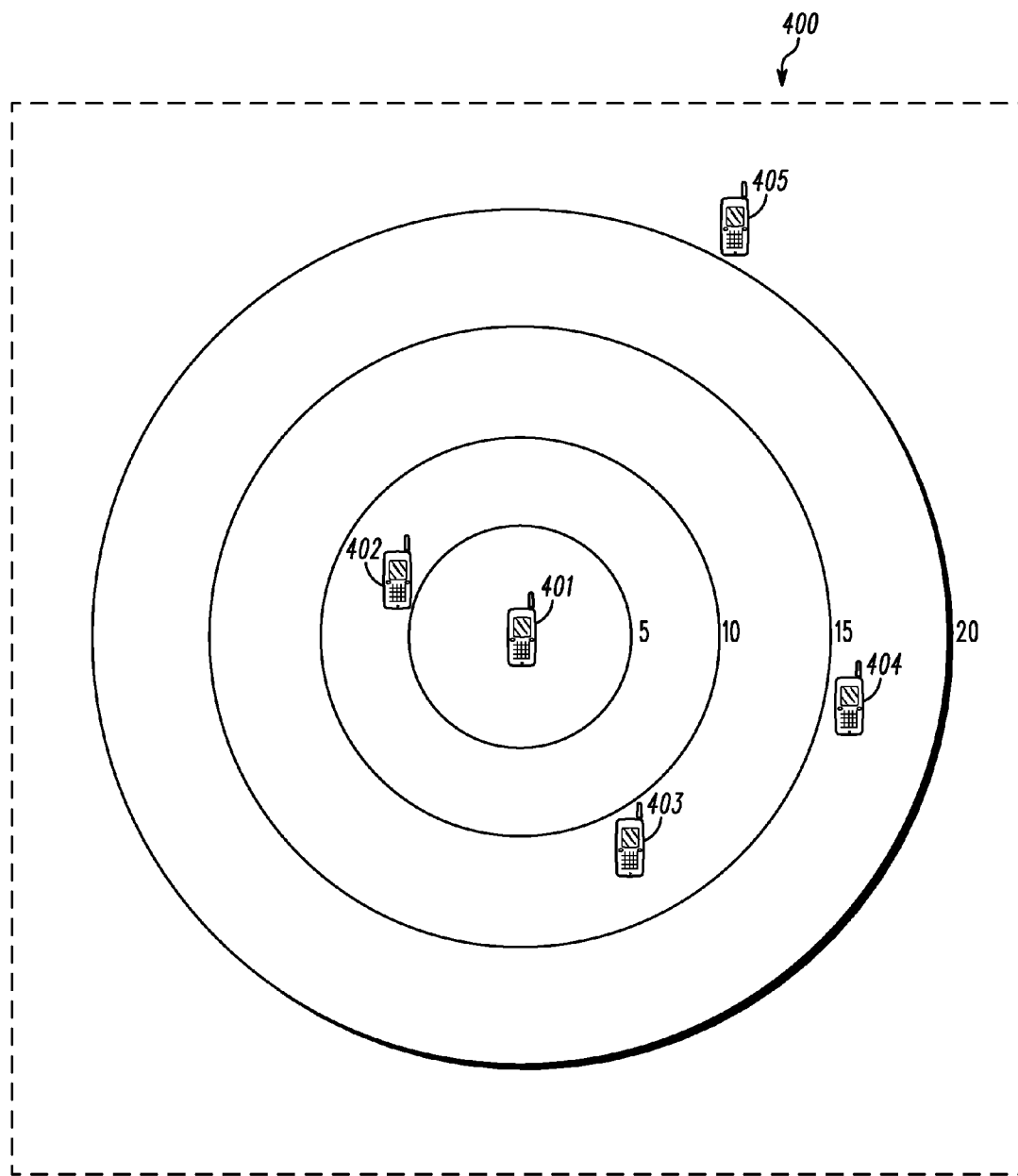
FIG. 4 is an aerial view of a group of wireless playback devices distributed within a playback area in accordance with an embodiment of the present invention.

FIG. 4 shows an aerial view of a plurality of user devices 401-405 geographically dispersed within area 400. Area 400 is any area where two or more users can meet and listen to audio simultaneously. Examples of such areas are conference rooms, classrooms, school cafeterias, offices, houses, parks, vehicles, and the like. For ease of illustration, the devices, but not the device users, are shown in the figure. Four concentric circles are shown in the drawing to represent distances, in increments of 5 feet. The circles radiate outward from the first device 401, which, in this example, is the originating device which is the center or origin of the propagating acoustic signal and may distribute audio data to the other devices 402-405 in a manner that will be described below.

In embodiments of the present invention, the originating device 401 distributes audio files or data to the other devices 402-405, which can be any number of devices. The receiving devices 402-405 then generate audio (from the audio file) substantially in unison with the sending device to create a multi-device group playback experience. The sending device 401 can send the entire files directly to the devices, stream the files to the devices, make the files available for download from a network, such as a LAN or the internet, place the files on a distributable media, use any method now known or later developed for distributing or sharing data between devices, or trigger the playback of a file that is already present on the playback device. To reach a high level of fidelity, it is desirable for the devices 401-405 to coordinate their playback so that all devices are coordinated with each other.

Sound Delay

As is well known in physics, sound travels at a speed of approximately $331.4+0.6T_c$ m/s in dry air, where $T_c$ is the Celsius temperature. Therefore, due to the maximum speed of sound waves, if the same audio wave is sent simultaneously from two devices each located at different distances from a single point, the waves will reach the point at different times. This variation in arrival times results in distortion in the audio reception, commonly known as an echo. It is therefore advantageous to coordinate the devices so that each device delays or anticipates a point in time so that the devices work together to create a single audio playback system that produces a uniform wavefront that propagates out from the originating device. When the phasing of the playback of the signal at each playback device correctly coincides with the signal arriving from the direction of the originating device, the well known precedence effect, as first discovered by Joseph Henry in 1849 and later described by Helmut Hass, will cause the sound to seem as if it originated from the direction of the originating device independent of the intensity difference arriving from the direction of the originating device, the local playback device, or the more delayed "echo" signals coming from other devices in the virtual playback system.

As an example, with reference to FIG. 4, if the originating device 401 were used as the reference point, device 401 should generate audio before any other device. Next, the next closest device 402 will generate audio from the audio file. Given that sound travels at a speed of approximately $331.4+0.6T_c$ m/s and the devices are, in this example, at 5 foot increments from the originating device 401, the second device 402 should generate audio approximately 4.4 ms after the first device 401 so that a unified front of music travels toward the next device 403. Following this scheme, the audio waves output from all of the playback devices 401-405 will reach each device in such a manner as to sound as if the audio emanated from the originating device 401.

With the scheme described above, and without accounting for other factors, such as wind, altitude, humidity, etc., one can hear clear sound at each device, sounding as if it came from the originating device 401, and can hear it at a volume level higher than could be heard if only a single device were generating the audio. Using this scheme, groups of people are able to join together to create a shared group experience that generates the audio for a song, for instance, at an enjoyable level, from each of their phones or other devices, to result in a multi-device audio player.

User/Device Movement

Users are generally mobile and will change their location during playback. For instance, during playback of an audio file, users may switch seats so that devices 402 and 405 switch positions. Going back to the example given in the previous section, where device 405 was initially determined to be the furthest away from the originating device 401 and is the last device to generate audio, audio from the originating device 401 will reach device 405 long before device 405 plays back the audio, and the audio of device 402, which is the second to generate audio in this example, would be generated long before the wavefront arrives from device 401. The repositioning of devices without correcting phase leads to distortion or muddying of the signal in the unified playback scheme. Therefore, as will be explained below, embodiments of the present invention dynamically track device position to continuously adjust the playback phase of the generated audio.

Network Delay

Embodiments of the present invention overcome variations in network delay that exist between network providers. Network delay occurs between the time the sending device initiates communication, which is usually marked by the beginning of transmission of a streaming file, and the time it is actually received by any one of the playback devices 402-405. Network delays are caused by a myriad of factors, such as network technology, switching times, traffic, capacity, equipment failures, conversions, processing speeds, and many others. Each network provider utilizes different equipment and protocols, resulting in a variation of network delay between providers. As a result, a device on one network may receive the audio data before a device connected to a second network, which may receive it before a device on a third network. If each device were to simply start the playback as soon as the file is received, in all likelihood, each device would begin playing at different times.

Device Variation

Embodiments of the present invention overcome the inherent variation and delay caused by the data handling capacity and methodology of individual playback devices. These variations are the result of each device's operating system, particular software, hardware, age, and other factors. The delay may occur in devices of the same or different manufacturers. Again, if each device were to simply start the playback as soon as the file is received, in all likelihood, each device would begin playing at different times.

Dynamic Phase Detection and Correction

In embodiments of the present invention, the device's starting location with reference to a sending unit 401 is determined prior to the initiation of audio generation. The starting location can be determined via the GPS receiver 324, or any other technique. For instance, in cellular communication networks, the location of the cellular handset may be determined by a network-based locating scheme, implemented either at the handset or at the cellular communication network. Known cellular communication network based positioning schemes include, among others, those based on network signal strength measurements at the cellular handset or on signal timing measurements made at the handset, e.g., by time of arrival (TOA) or time difference of arrival (TDOA) or by some other positioning scheme, such as triangulation. Other non-radio-frequency based distance detection methods can be utilized to detect the distance of the playback units from the originating unit such as ultrasonic echo-repeating. Location determining circuits and their use is well known and will not be described in detail here.

Phase Coordination

To account for variations in the devices and networks, one embodiment of the present invention provides an initialization phase that determines a network delay value between the source of the media being played back and a playback device, and a separation distance between the playback device and the originating device, and provides at least one device in the playback group that listens to the audio output from one or more of the other devices and ensures that the listening device is in phase with the other devices. The listening playback device is able to adjust its audio playback as necessary.

When coordinated audio is to be generated, the sending device connects with one or more playback devices. The connection can be any method of allowing two devices to communicate data. The connection process, in one embodiment, includes determining a network delay, which may include current traffic conditions or hardware factors. For example, the sending device 401 may perform a "ping" toward the playback device and store that round trip time. Alternatively, sending device 401 may periodically send out a dummy registration request and measure the time it takes to receive a reply. The particular method used to determine network delay is not important and can include any network-delay-determining procedure.

When audio generation is to take place, the sending unit 401 will generate audio at a time T1, which can refer to the sending unit's start time, to a point within the audio file, to repeated time markers within the file, or any other way of determining timing of an audio file playback. Each unit that has determined its distance from the sending unit 401 will begin its playback at times T2-Tn, where times T2-Tn actually come after, time T1. Times T2-Tn, in one embodiment of the present invention, are calculated based on an absolute distance the device is from the originating device taking into account the determined network delay. Distance and network delay determination are described above.

In addition to using the GPS receiver to find device location, as described above, the GPS receiver can also be used to coordinate each device's clock 312. Such use of a GPS receiver is explained in commonly assigned U.S. Pat. No. 5,953,384 to Walsh, et al., entitled "AUTOMATIC MEASUREMENT OF GPS CABLE DELAY TIME." Coordination of the clocks allows the devices to properly begin and adjust transmission of the audio signals.

The devices 401-405 can develop an initial coordination scheme based on their initial positions relative to one another. However, this initial position determination does not account for the above-mentioned network delay time, device playback time variations, or repositioning of the devices. Due to these variations, after the initial playback begins, the devices may need to adjust their coordination by speeding up, slowing down, skipping ahead, or pausing as necessary.

In embodiments of the present invention, the devices sample the audible audio playback signal from one or more of the other audio generating devices via their microphone 110 or other input. The audio is then processed via processor 306 to identify time points within the received audio. The processor, through well-known algorithms, can then calculate adjustments that the device should make (i.e., skip ahead, pause, etc.) to its audio generation timing. This sampling and adjusting process compensates for network or device variations.

In one embodiment of the present invention, the sending device places an identifier signal in its generated audio signal that will identify the sending device's audio from that of the other audio generating devices. In this embodiment, the identifier signal is undetectable to the human ear, so playback quality is not compromised. Each playback device 401-405 is then able to distinguish the sending device's signal from the others and to use only the sending device's audio signal to coordinate with the sending device 401.

In other embodiments, one or all of the audio generating devices can generate an identifier signal on top of the audio to allow the other devices to distinguish each device and to allow all or a subset of the devices to work together to develop an overall timing scheme for unified playback of the shared audio file.

Figure 5:
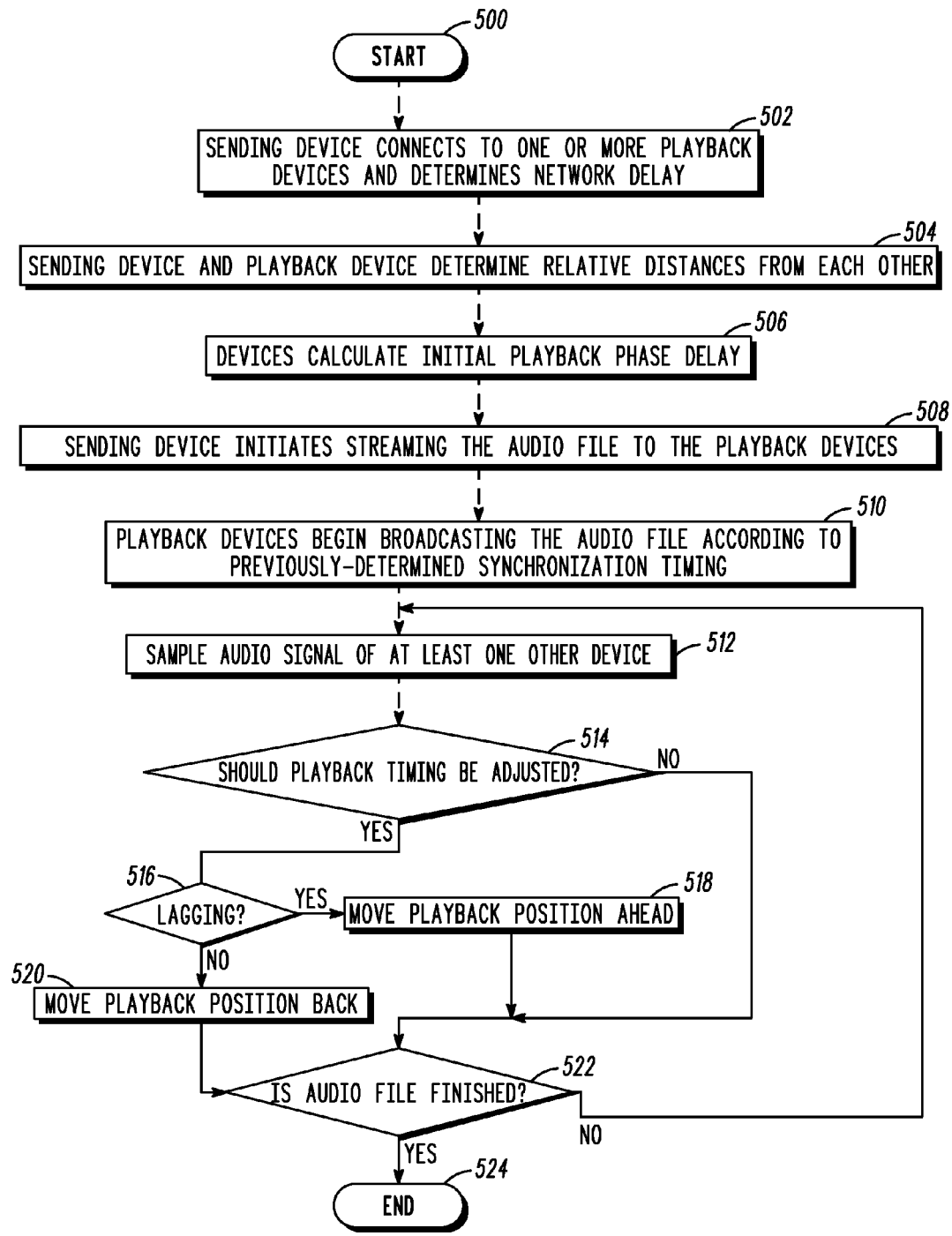
FIG. 5 is a flow diagram illustrating an exemplary operation of one of the wireless devices of FIG. 4 in accordance with an embodiment of the present invention.

FIG. 5 is a flow chart showing one embodiment of the coordination process of the present invention. The process begins at step 500 and moves directly to step 502 where the originating device connects to one or more playback devices. In this step, the originating device determines, through pinging or some other method, the amount of network delay that is present between the sending device and the playback devices. In step 504, the originating device and the playback devices determine their relative distances from each other. This can include the playback devices finding their distance from only the sending device or finding their distance from the sending device and from each of the other devices as well. Once the distances are determined, in step 506, the devices calculate their initial playback phase delay. The playback phase delay is a combination of the determined network delay and relative distance from the sending device. The device timing can anticipate or be delayed from the sending device's playback, depending on the particular playback scheme utilized by the devices.

In step 508, the sending device initiates streaming the audio file to the playback devices. Next, in step 510, the playback devices begin generating audio from the audio file according to the previously-determined coordination timing. In step 512, the device samples the audio signal of at least one other device. The device then determines, in step 514, based on the sample, whether the device should adjust its playback timing. If the answer is yes, it is determined in step 516 whether the audio is lagging the sampled audio. If the playback device's audio is determined to be lagging the other device's position in the playback, the flow moves to step 518 where the playback device moves the position of playback in the audio file ahead either by temporarily speeding up the audio or by skipping ahead. The flow then moves to step 522 where it is determined whether the audio file has reached an end point. If the answer to step 516 is no, the audio file must be leading the sampled audio. Therefore, flow moves to step 520 where position of playback in the audio file is moved back. If, on the other hand, in step 514, the playback device's audio is determined to be aligned with the sending device's position in the playback, the flow moves to step 522, where a check is made to see if the audio file is finished. If the audio file is not yet finished, the flow returns to step 512, where a new audio sample is taken. If, however, the audio file is finished, the flow moves to step 524 and ends.

Therefore, embodiments of the present invention utilize both location determination and dynamic audio monitoring to dynamically coordinate a playback device with the sending device.

It should be clear to one knowledgeable in the art that the originating device can be the sending device if the originating device is broadcasting the audio file. The originating device can also be a playback device if the audio file is stored locally on each device, or is being streamed from a server on the network. If the file is stored locally on each device, there is no sending device in the system just an originating device, and in this case knowledge of the network delay is not necessary. A command can be sent to each playback device to begin playback at a time based on its synchronized system clock and the acoustic delay between the originating device and the playback device.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "program", "computer program", "software application", and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A wireless audio playback device comprising:
   a location determining circuit adapted for determining a position of the wireless audio playback device;
   an interface adapted for:
      receiving a signal from an originating device,
      sending a reply to the signal,
      receiving a network delay value based at least in part on the reply to the signal,
      receiving a location of the originating device, and
      receiving at least a portion of an audio file; and
   an audio output adapted for generating audio from the audio file, the audio generation being coordinated with audio generation by the originating device based upon the network delay value and a distance between the wireless audio playback device and the originating device.

2. The wireless playback device according to claim 1, wherein the received at least a portion of an audio file is at least one of:
   sent from the originating device;
   streamed from a network; and
   previously stored on the playback device.

3. The wireless playback device according to claim 1, wherein the network delay is a time for the signal to travel over a network path from the originating device to the wireless playback device.

4. The wireless playback device according to claim 1, wherein the location of the originating device is a distance between the wireless playback device and the originating device.

5. The wireless playback device according to claim 1, further comprising:
   an audio input for receiving an audio signal generated by a first wireless device; and a comparator for comparing a timing of the received audio signal with a timing of the audio generated by the first wireless device.

6. The wireless playback device according to claim 5, wherein the first wireless device is the originating device.

7. A method for coordinating audio generation between a wireless playback device and an originating device, the method comprising:
- receiving a signal from the originating device;
- sending a reply to the signal;
- receiving a network delay value based at least in part on the reply to the signal;
- receiving a location of the originating device;
- receiving at least a portion of an audio file; and
- generating audio from the audio file,
- wherein the generation of the audio is coordinated with audio generation by the originating device based upon the network delay value and a distance between the wireless audio playback device and the originating device.

8. The method according to claim 7, wherein the received at least a portion of an audio file is at least one of:
- sent from the originating device;
- streamed from a network; and
- previously stored on the playback device.

9. The method according to claim 7, wherein the network delay is a time for the signal to travel over a network path from the originating device to the wireless playback device.

10. The method according to claim 7, wherein the location of the originating device is a distance between the wireless playback device and the originating device.

11. The method according to claim 7, further comprising:
- receiving an audio signal generated by a first wireless device; and comparing a timing of the received audio signal with a timing of the audio generated by the wireless playback device.

12. The method according to claim 11, wherein the first wireless device is the originating device.

13. A computer program product for coordinating a wireless playback device with an originating device, the computer program product comprising a tangible storage medium readable by a processing circuit and storing instructions for execution by the processing circuit for performing a method comprising:
- receiving a signal from the originating device;
- sending a reply to the signal;
- receiving a network delay value based at least in part on the reply to the signal;
- receiving a location of the originating device;
- receiving at least a portion of an audio file; and
- generating audio from the audio file,
- wherein the generation of the audio is coordinated with audio generation by the originating device based upon the network delay value and a distance between the wireless audio playback device and the originating device.

14. The computer program product according to claim 13, wherein the signal is a ping.

15. The computer program product according to claim 13, wherein the network delay is a time for the signal to travel over a network path from the originating device to the wireless playback device.

16. The computer program product according to claim 13, wherein the location of the originating device is a distance between the wireless device and the originating device.

17. The computer program product according to claim 13, further comprising:
- receiving an audio signal generated by a first wireless device; and
- comparing a timing of the received audio signal with a timing of the audio generated by the wireless playback device.

18. The method according to claim 13, wherein the first wireless device is the originating device.

* * * * *